US012427791B2

(12) United States Patent
Yokoyama

(10) Patent No.: US 12,427,791 B2
(45) Date of Patent: Sep. 30, 2025

(54) LABEL PRINTER

(71) Applicant: TOSHIBA TEC KABUSHIKI KAISHA, Tokyo (JP)

(72) Inventor: Shuji Yokoyama, Sunto Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 249 days.

(21) Appl. No.: 18/155,690

(22) Filed: Jan. 17, 2023

(65) Prior Publication Data

US 2023/0364925 A1 Nov. 16, 2023

(30) Foreign Application Priority Data

May 13, 2022 (JP) ................................ 2022-079247

(51) Int. Cl.
*B41J 3/407* (2006.01)
*B41J 15/04* (2006.01)
*B41J 15/16* (2006.01)

(52) U.S. Cl.
CPC ............. *B41J 3/4075* (2013.01); *B41J 3/407* (2013.01); *B41J 15/042* (2013.01); *B41J 15/04* (2013.01); *B41J 15/16* (2013.01)

(58) Field of Classification Search
CPC ........ B41J 3/4075; B41J 3/407; B41J 15/042; B41J 15/04; B41J 15/16
See application file for complete search history.

(56) References Cited

U.S. PATENT DOCUMENTS

2003/0053835 A1* 3/2003 Bernhard ................ B41J 15/04 400/615.2
2010/0200166 A1 8/2010 Watanabe

* cited by examiner

*Primary Examiner* — Geoffrey S Mruk
(74) *Attorney, Agent, or Firm* — Kim & Stewart LLP

(57) ABSTRACT

A label printer for printing on a label sheet that is stored in a rolled shape and includes a base sheet and a plurality of labels attached thereon, includes a platen roller configured to convey the label sheet, a head configured to print on a label of the conveyed label sheet, a peeling bar by which the printed label is peeled off from the base sheet, a winding shaft configured to rotate to wind thereon the base sheet from which the printed label has been peeled off, and a support member configured to pivot around an axis at a first end thereof and biased to press with a second end thereof the base sheet wound around the winding shaft.

18 Claims, 7 Drawing Sheets

Prior Art

LABEL PRINTER

CROSS-REFERENCE TO RELATED APPLICATION(S)

This application is based upon and claims the benefit of priority from Japanese Patent Application No. 2022-079247, filed May 13, 2022, the entire contents of which are incorporated herein by reference.

FIELD

Embodiments described herein relate generally to a label printer.

BACKGROUND

A printer that prints on a label sheet stored in a rolled shape around a shaft discharges a label separated from a base sheet by a peeling unit. The base sheet from which the label sheet has been separated is wound around another shaft. Such a printer winds the base sheet until the printed label is separated therefrom, and then performs a back feed operation to position the next label at the printing start position.

However, in such a printer, when the back feed is performed in a case where the winding amount of the base sheet is large, the rewound base sheet is deflected. Further, when the winding is performed again after the back feed, there is a possibility that the deflected base sheet cannot be wound up neatly on the winding shaft, and in the worst case, there is a possibility that the base sheet is disengaged and the winding cannot be normally performed.

SUMMARY OF THE INVENTION

Embodiments provide a label printer capable of improving the running stability and the winding property of a base sheet when the base sheet is wound and fed after printing.

In one embodiment, a label printer for printing on a label sheet that is stored in a rolled shape and includes a base sheet and a plurality of labels attached thereon, includes a platen roller configured to convey the label sheet, a head configured to print on a label of the conveyed label sheet, a peeling bar by which the printed label is peeled off from the base sheet, a winding shaft configured to rotate to wind thereon the base sheet from which the printed label has been peeled off, and a support member configured to pivot around an axis at a first end thereof and biased to press with a second end thereof the base sheet wound around the winding shaft.

DETAILED DESCRIPTION

Hereinafter, a label printer 10 according to an embodiment of the present invention will be described in detail with reference to the accompanying drawings.

(Overall Configuration of Label Printer)

Figure 1:
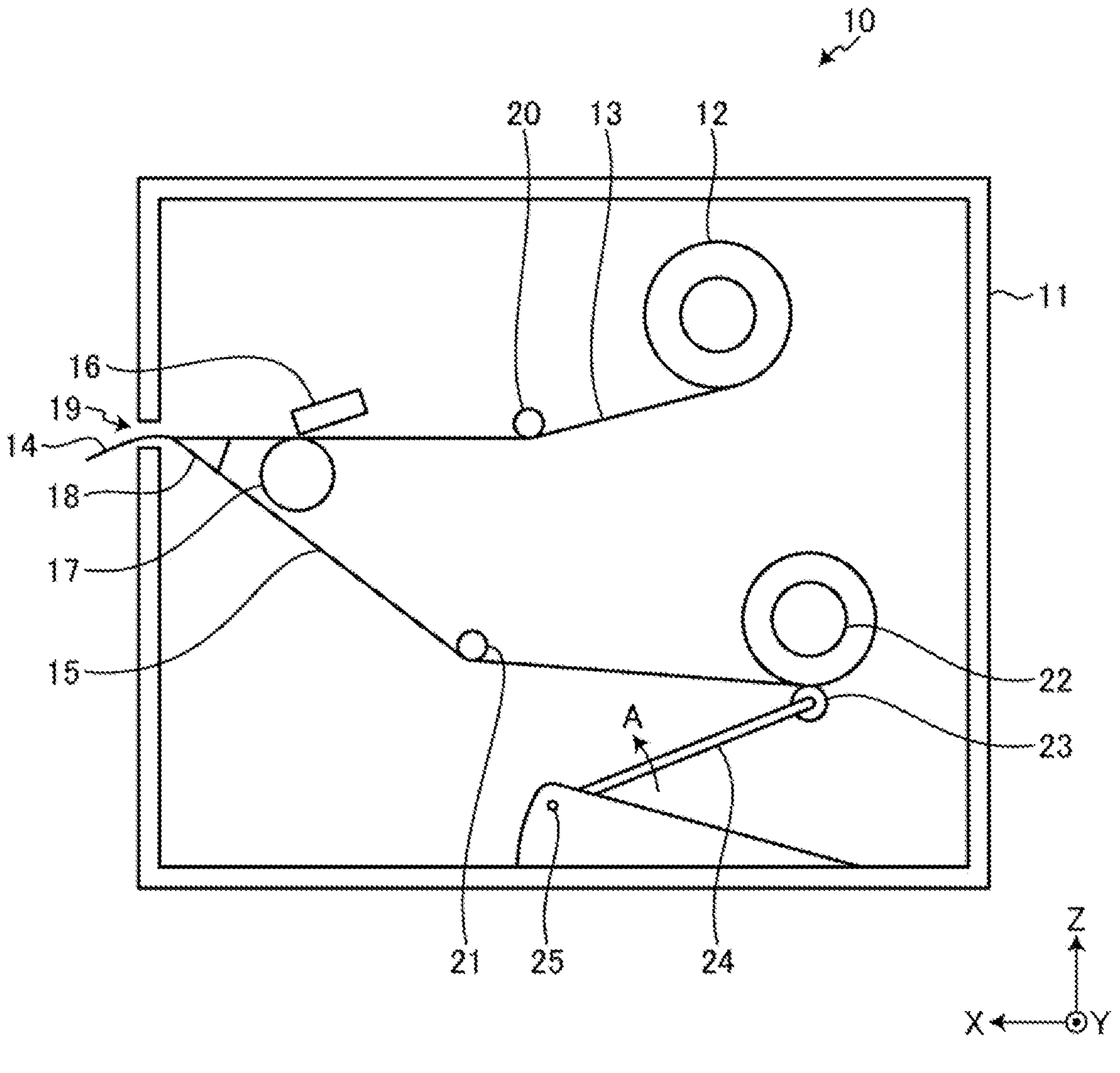
FIG. 1 is a cross-sectional view of a label printer according to an embodiment.
Figure 5:
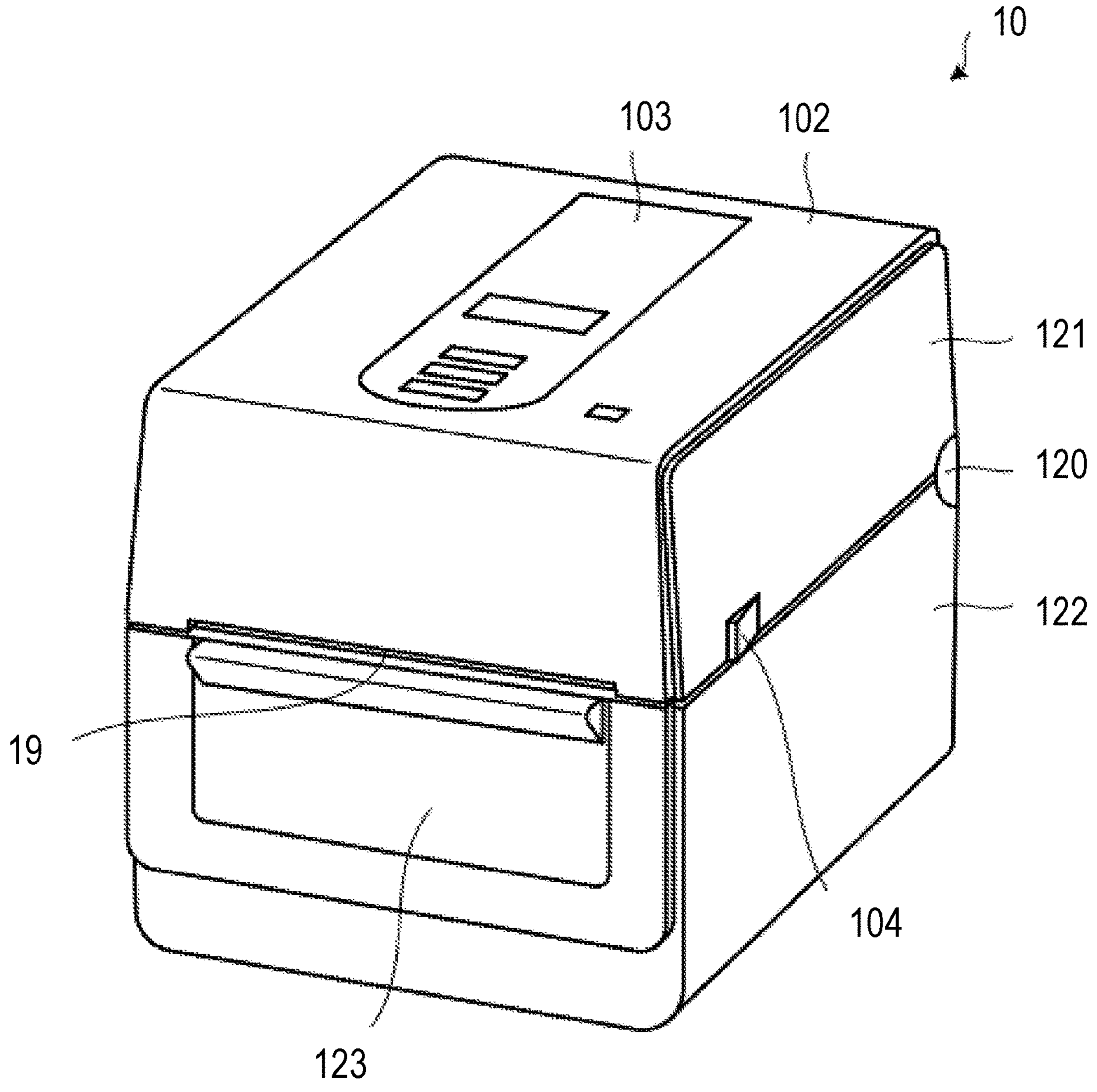
FIG. 5 is a perspective view of the label printer.

A schematic configuration of the label printer 10 will be described with reference to FIG. 1. FIG. 1 is a cross-sectional view of the label printer 10. The exterior of the label printer 10 is illustrated in FIG. 5. As shown in FIG. 5, the label printer 10 in one embodiment includes a housing 102 having an upper case 121 and a lower case 122 rotatably connected by a hinge 120, a display operation unit 103, an opening/closing button 104, a sheet discharge port 19, and a front cover 123.

The label printer 10 further includes a label roll 12 in which a label sheet 13, which is a printing sheet on which an image is printed, is wound in a roll shape inside a housing 11. The label printer 10 performs printing while pulling out the label sheet 13 from the label roll 12.

The label sheet 13 is wound in a roll shape in a state where a plurality of labels 14 is attached to a base sheet 15. The label sheet 13 drawn out from the label roll 12 is conveyed toward the sheet discharge port 19 in a state of being sandwiched between a platen roller 17 and a thermal head 16. At this time, the label 14, which is a printing surface, is located on the thermal head 16 side. The platen roller 17 is rotated by a motor such as a stepping motor (not shown). The platen roller 17 rotates counterclockwise in FIG. 1 to convey the label sheet 13 in the forward direction. The platen roller 17 rotates clockwise in FIG. 1 to convey the label sheet 13 in the backward direction. The platen roller 17 is also referred to as the conveyance unit in the present disclosure.

The thermal head 16 has a structure in which a plurality of heating elements are aligned, and performs printing on the label 14 by causing the heating elements corresponding to a printing pattern to generate heat so as to heat the label sheet 13 sandwiched and conveyed between the thermal head 16 and the platen roller 17 with. The thermal head 16 is also referred to as the printing unit in the present disclosure. The label printer 10 may be configured to perform printing by sandwiching an ink ribbon (not shown) between the thermal head 16 and the label sheet 13 and transferring the ink of the ink ribbon heated by the thermal head 16 to the label 14.

The back side of the label 14 is an adhesive layer, and the label 14 is attached to the base sheet 15 by the adhesive layer. The label sheet 13 on which printing has been completed is separated into the label 14 and the base sheet 15 by a peeling bar 18. The peeling bar 18 is a V-shaped columnar member having two surfaces intersecting each other at an acute angle. The peeling bar 18 extends along the Y-axis. The label sheet 13 on which printing has been completed is folded back at the acute angle by the peeling bar 18. At this time, the label 14 is peeled off from the bent label sheet 13. The peeling bar 18 is also referred to as the label peel unit in the present disclosure.

The label 14 peeled off from the base sheet 15 in this manner is discharged from the sheet discharge port 19.

Further, the base sheet 15 from which the label 14 has been peeled off is wound around a winding shaft 22 which is stretched around a pinch roller 21 and is rotated by a motor (not shown). The winding shaft 22 is also referred to as the base sheet winding unit in the present disclosure.

The base sheet 15 wound on the winding shaft 22 is pressed by a driven roller 23. The driven roller 23 is rotatably attached to a distal end of a support member 24 biased in the direction of the arrow A. The driven roller 23 presses the base sheet 15 wound around the winding shaft 22 and follows the rotation of the winding shaft 22 and the movement of the base sheet 15 wound around the winding shaft 22. The driven roller 23 is also referred to as the pressing unit in the present disclosure.

The support member 24 rotates about a rotation shaft 25 in XZ plane of FIG. 1. For example, a torsion spring (not illustrated) is installed in the rotation shaft 25, and the support member 24 is biased in the direction of the arrow A by the torsion spring.

(Structure for Conveying Label Sheet and Base Sheet)

Figure 2A:
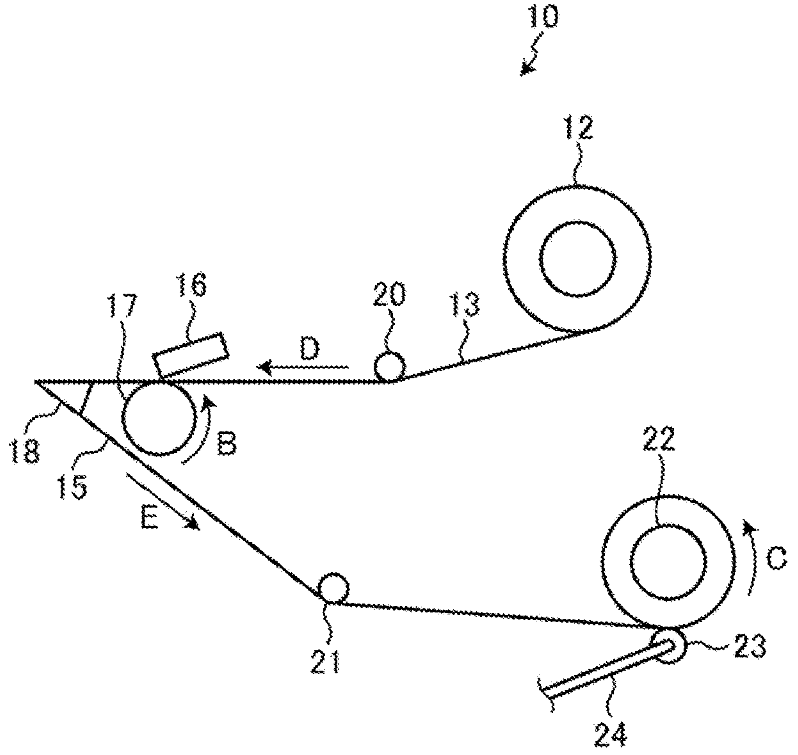
FIG. 2A is a cross-sectional view of an internal structure of the label printer performing a printing operation.
Figure 2B:
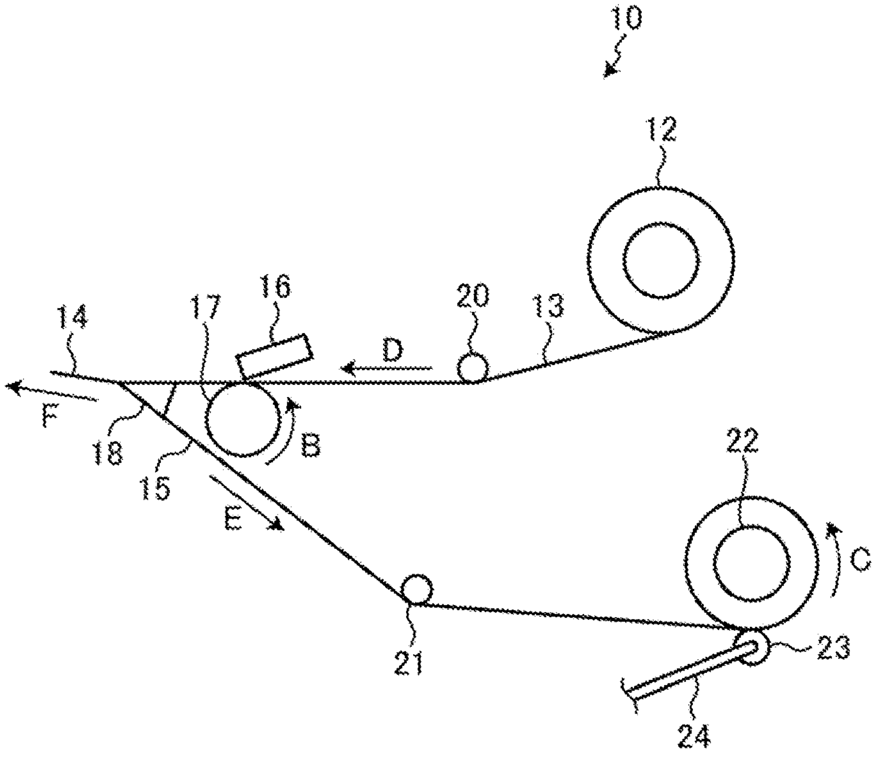
FIG. 2B is a cross-sectional view of the internal structure of the label printer performing a peeling operation.
Figure 2C:
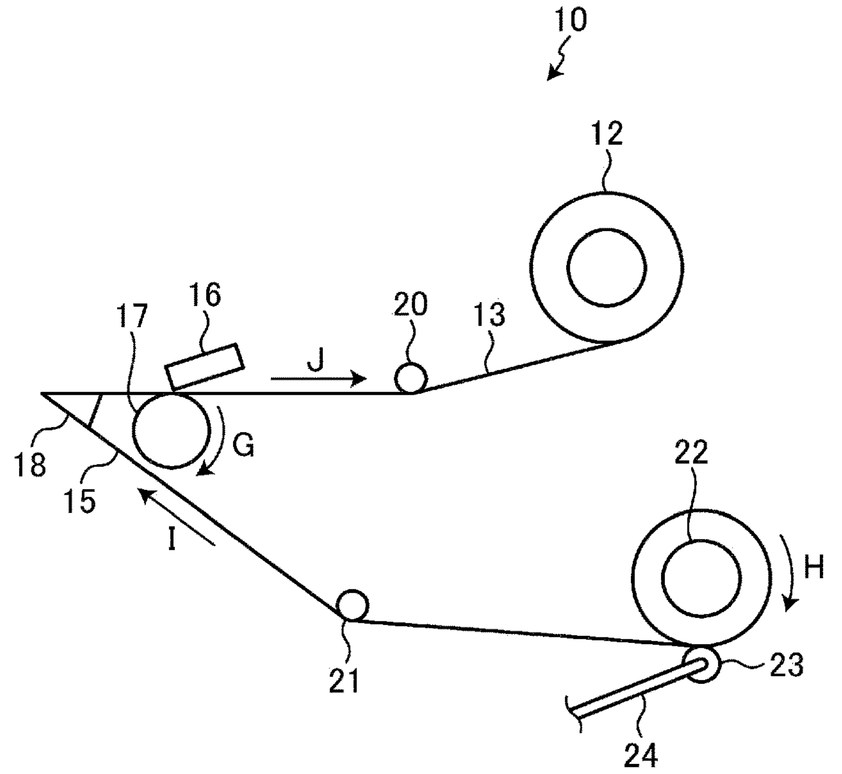
FIG. 2C is a cross-sectional view of the internal structure of the label printer performing a back feed operation.

FIGS. 2A, 2B, and 2C depict how the label sheet 13 and the base sheet 15 are conveyed within the label printer 10. FIG. 2A is a cross-sectional view of the internal structure of the label printer 10. FIG. 2B depicts how the label printer 10 performs a peeling operation for a printed label 14. FIG. 2C depicts how the label printer 10 performs a back feed operation.

When performing a printing operation, the label printer 10 rotates the platen roller 17 in the direction indicated by the arrow B, that is, in the counterclockwise direction in the FIG. 2A, by controlling the motor (not shown) to rotate the platen roller 17. As a result, the label sheet 13 drawn out from the label roll 12 is passed over a pinch roller 20 and conveyed in the direction of the arrow D. The label printer 10 prints on the label 14 sandwiched between the thermal head 16 and the platen roller 17.

At this time, the winding shaft 22 and the platen roller 17 are rotated simultaneously. That is, the winding shaft 22 rotates in the direction indicated by the arrow C, that is, in the counterclockwise direction in the FIG. 2A. As a result, the base sheet 15 from which the label 14 has been peeled off from the label sheet 13 is stretched over the pinch roller 21, is conveyed in the direction of the arrow E, and is wound up on the winding shaft 22. Note that conveying the label sheet 13 in the direction of the arrow D and conveying the base sheet 15 in the direction of the arrow E is referred to as conveying the sheet 13 or 15 in the forward direction.

At this time, one or more drive circuits or controllers (not shown) control the motors to rotate the platen roller 17 and the winding shaft 22 in synchronization with each other.

The base sheet 15 wound on the winding shaft 22 is pressed in a direction toward the winding shaft 22 by the driven roller 23 supported by the leading end of the support member 24. Therefore, the base sheet 15 is stably wound on the winding shaft 22.

The label sheet 13 including the label 14 on which printing has been completed is conveyed in the direction indicated by the arrow D shown in FIG. 2B, and is turned at an acute angle at the position of the peeling bar 18. At this time, the label 14 is peeled off from the label sheet 13. The peeled label 14 is pushed out in the direction of the arrow F and discharged from the sheet discharge port 19 (see FIG. 1).

After the peeling of the label 14 is completed, the label printer 10 performs a back feed operation by which the base sheet 15 and the label sheet 13 are conveyed in a direction opposite to the forward direction as shown in FIG. 2C. The back feed operation is performed to pull back the leading end of the label 14 to be printed next to the upstream side of the thermal head 16.

At this time, the platen roller 17 and the winding shaft 22 are simultaneously rotated clockwise as shown in FIG. 2C. That is, the platen roller 17 rotates in the direction of the arrow G, and the winding shaft 22 rotates in the direction of the arrow H.

By such rotation of the platen roller 17 and the winding shaft 22, the base sheet 15 is conveyed in the direction of the arrow I, and the label sheet 13 is conveyed in the direction of the arrow J. Note that the conveyance amount at the time of the back feed operation is appropriately set in accordance with the size of the label 14 attached to the label sheet 13, the interval between the adjacent labels 14, and the distance from the thermal head 16 to the peeling bar 18. Further, the amount of rotation of the winding shaft 22 at the time of the back feed operation is set to be constant regardless of the amount of winding of the base sheet 15. It should be noted that, by performing the back feed operation, the base sheet 15 is conveyed in the direction of the arrow I, and the label sheet 13 is conveyed in the direction of the arrow J (hereinafter referred to as the backward direction).

It has been described that the label sheet 13 and the base sheet 15, when conveyed in the forward and backward directions, the motors rotate the platen roller 17 and the winding shaft 22 simultaneously. However, those motors do not necessarily rotate at the same time as long as a greater tension than necessary is not applied to the label sheet 13 and the base sheet 15.

Specifically, when the label sheet 13 and the base sheet 15 are conveyed in the forward direction, the platen roller 17 may be rotated first, and then the winding shaft 22 may be rotated with a slight delay. Further, when the label sheet 13 and the base sheet 15 are conveyed in the backward direction, the platen roller 17 may be rotated slightly later after the winding shaft 22 is rotated first.

(Structure of Driven Roller)

Figure 3A:
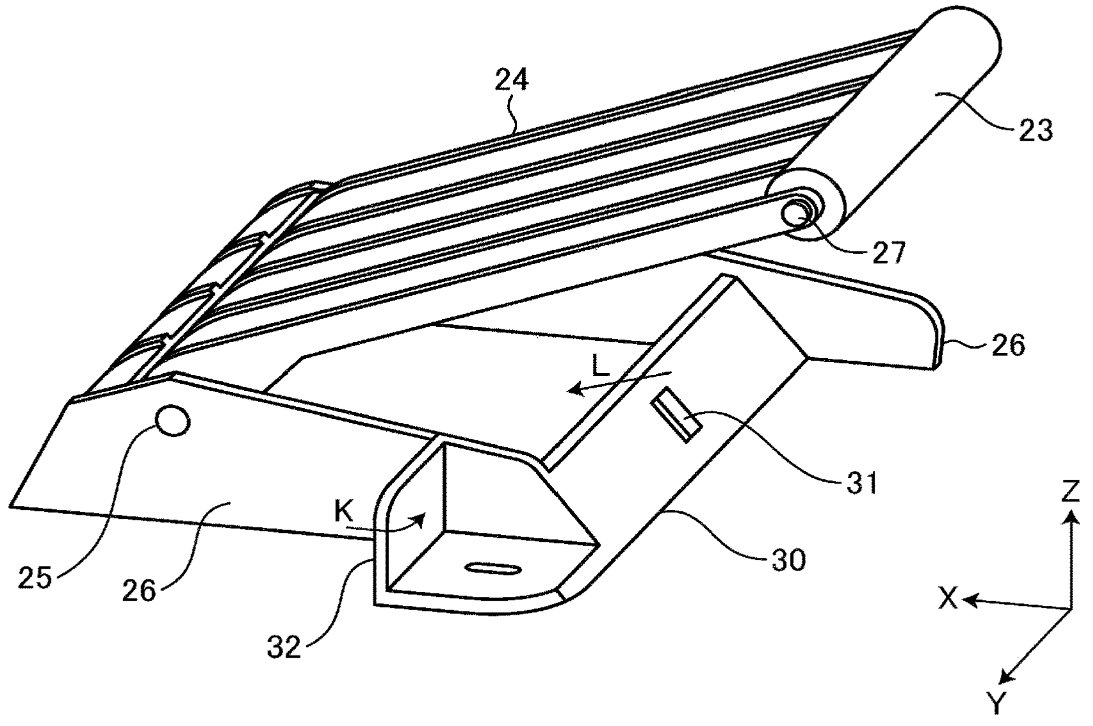
FIG. 3A is a perspective view a driven roller of the label printer.
Figure 3B:
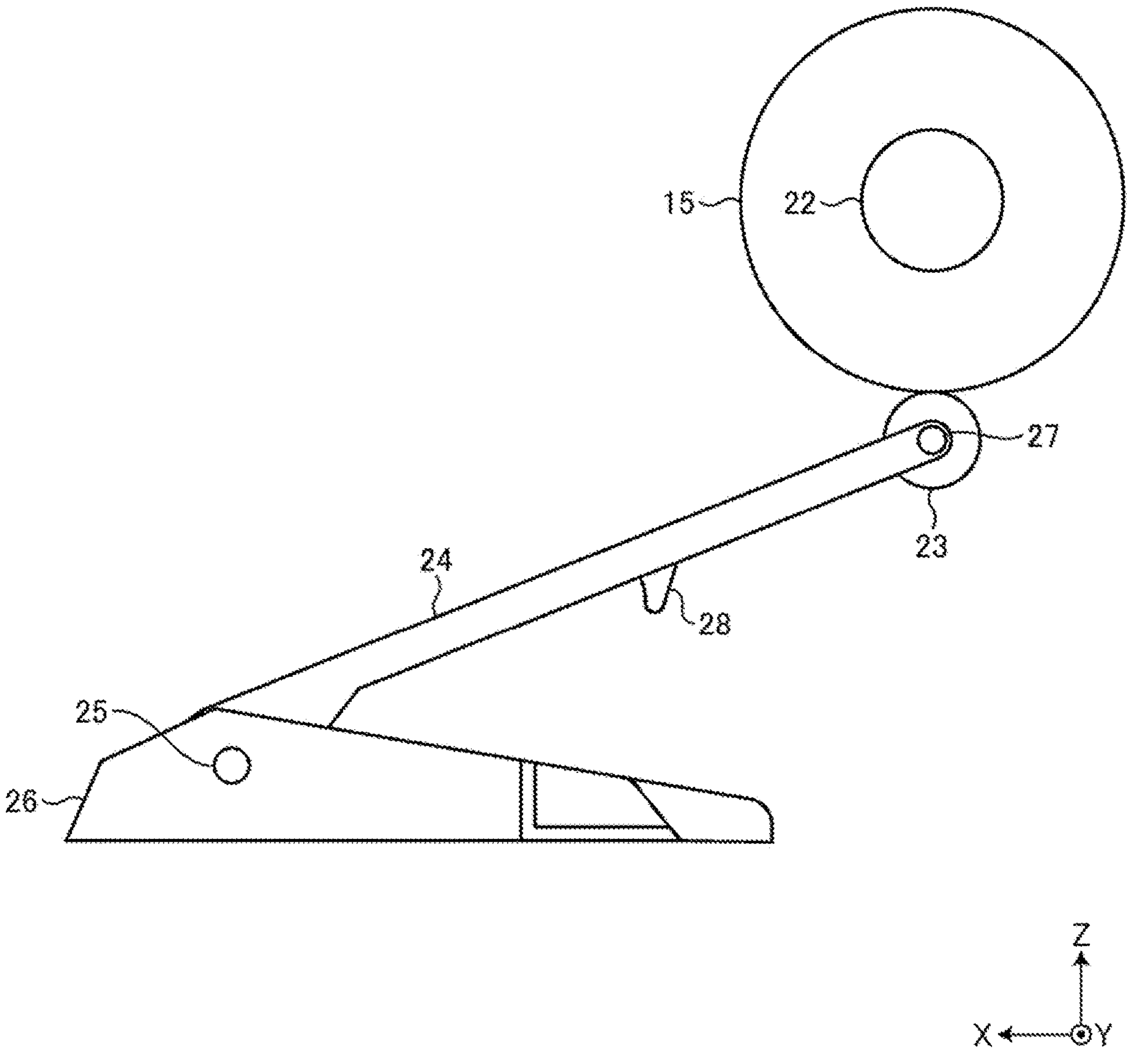
FIG. 3B is a side view of the driven roller in contact with a base sheet wound around a winding shaft.
Figure 3C:
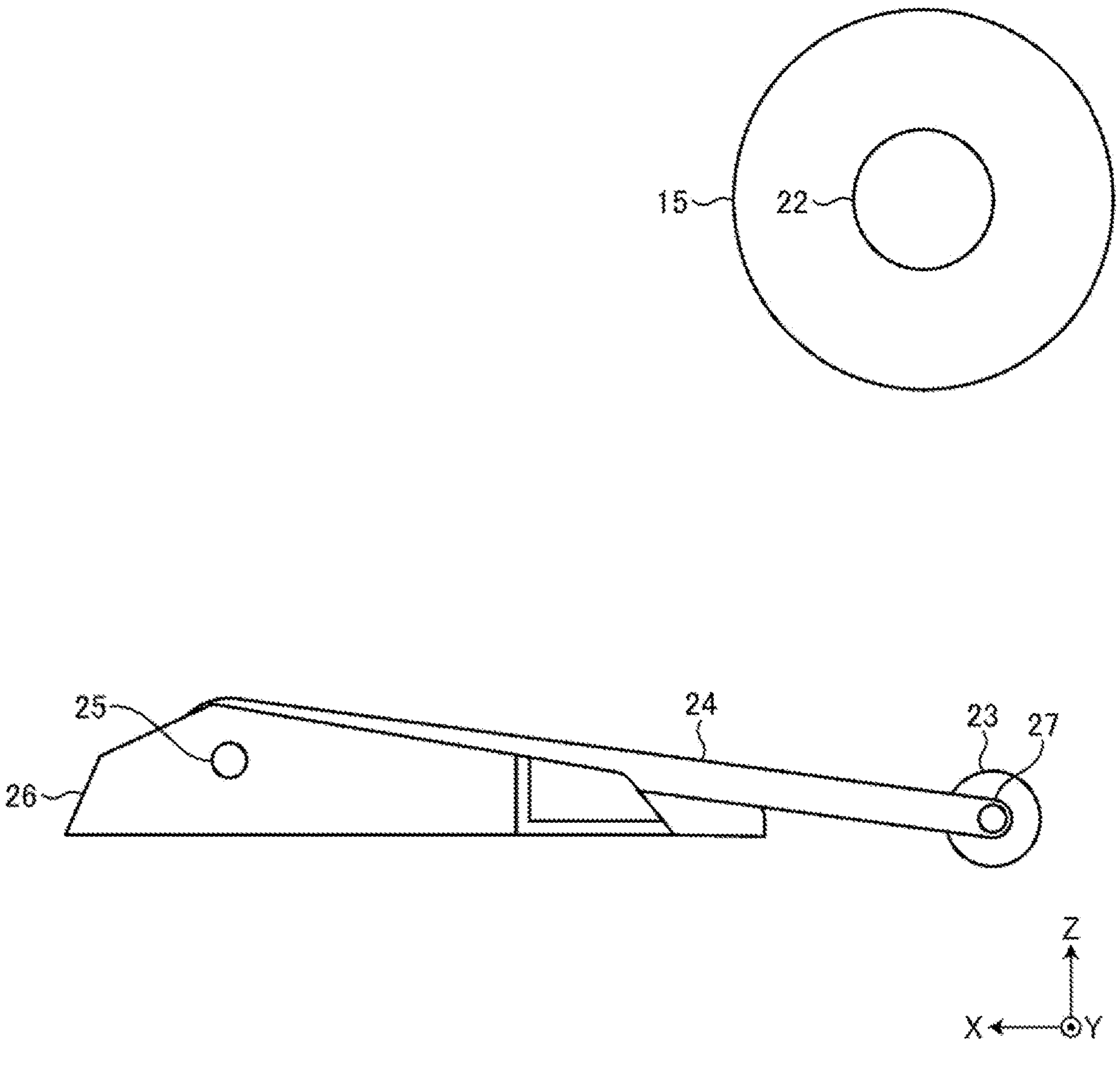
FIG. 3C is a side view of the driven roller that is retracted.

The configuration of the driven roller 23 will be described with reference to FIGS. 3A, 3B, and 3C. FIG. 3A is a perspective view of the driven roller 23. FIG. 3B is a side view of the driven roller 23 in contact with the base sheet 15 wound around the winding shaft 22. FIG. 3C is a side view of the driven roller 23 that has been retracted.

As shown in FIGS. 3A and 3B, the driven roller 23 is freely rotatably installed around a rotation shaft 27 installed along the Y-axis at the distal end of the support member 24. The support member 24 extends along the X-axis direction, and the rotation shaft 25 extending along the Y-axis is installed at the end portion of the support member 24 at which the rotation shaft 27 is not disposed. Both ends of the rotation shaft 25 are rotatably attached to a pair of attachment members 26, which are erected on the bottom surface of the housing 11. A torsion spring (not shown) is installed around the rotation shaft 25, and the support member 24 and the driven roller 23 are biased toward the Z-axis positive side by the torsion spring.

A thin plate-shaped abutting member 30 is installed on the X-axis negative side of the attachment members 26. The Y-axis negative side of the abutting member 30 is fixed to the side surface of one of the attachment members 26. The Y-axis positive side of the abutting member 30 is bent toward the X-axis positive side to form a release lever 32. That is, the abutting member 30 and the release lever 32 form a cantilever beam whose Y-axis negative side is fixed.

An opening 31 is formed in the abutting member 30 as shown in FIG. 3A. When the operator of the label printer 10 presses the support member 24 in the Z-axis negative direction, the surface of the support member 24 on the Z-axis negative side abuts against the abutting member 30. At this time, a protrusion 28 installed on the negative Z-axis surface of the support member 24 (which is shown in FIG. 3B) engages with the opening 31. As a result, as shown in FIG. 3C, the state in which the driven roller 23 and the winding shaft 22 do not come into contact with each other, that is, the state in which the pressure on the base sheet 15 is released is maintained. The protrusion 28 and the opening 31 make up a pressure release unit.

Thus, by holding the driven roller 23 in a state not in contact with the winding shaft 22, it is possible to easily detach the base sheet 15 wound on the winding shaft 22 and attach the base sheet 15 to the winding shaft 22.

Further, the operator of the label printer 10 can bend the thin plate-shaped abutting member 30 in the direction of the arrow L by pressing the release lever 32 in the direction of the arrow K. By this operation, the engagement between the opening 31 and the protrusion 28 is released, and the driven roller 23 returns to a state of being brought into contact with the winding shaft 22 by the aforementioned biasing force around the rotation shaft 25.

(Operation of Comparative Example)

Figure 4A:
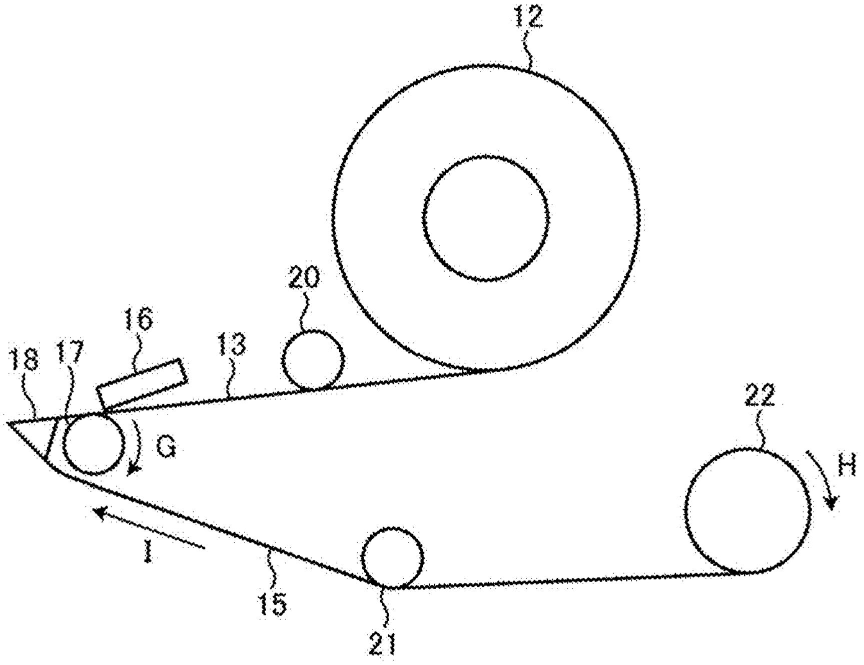
FIG. 4A depicts a label printer of a comparative example performing a back feed operation when an amount of the base sheet wound is small.
Figure 4B:
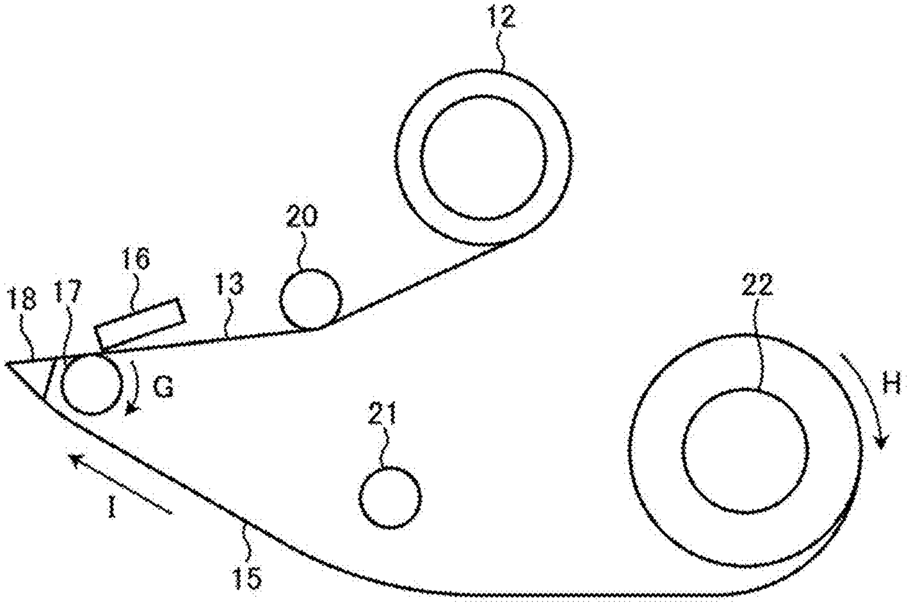
Prior Art FIG. 4B
FIG. 4B depicts the label printer of the comparative example performing the back feed operation when an amount of the base sheet wound up is large.

The back feed operation performed by a conventional label printer, which is a comparative example, will be described with reference to FIGS. 4A and 4B. FIG. 4A is a diagram of the label printer of the comparative example performing the back feed operation when an amount of the base sheet 15 wound is small. FIG. 4B is a diagram of the label printer of the comparative example performing the back feed operation when an amount of the base sheet 15 wound up is large.

As shown in FIG. 4A, when the amount of the base sheet 15 wound on the winding shaft 22 is small, the diameter of the winding shaft 22 is small, and therefore, there is no large difference between the back feed amount of the base sheet 15 by the platen roller 17 and the back feed amount of the base sheet 15 by the winding shaft 22. Therefore, the back fed base sheet 15 is not greatly deflected.

On the other hand, as shown in FIG. 4B, when the amount of the base sheet 15 wound up on the winding shaft 22 is large, even if the winding angle of the winding shaft 22 is the same as in FIG. 4A, due to the large amount of the wound base sheet 15, with respect to the back feed amount of the base sheet 15 by the platen roller 17, the back feed amount of the winding shaft 22 is increased, deflection occurs in the rewound base sheet 15. The deflected base sheet 15 is stretched when winding is performed again (e.g., when the base sheet 15 is conveyed in the forward direction). There is no problem if the deflection can be eliminated so as to be wound neatly with respect to the winding shaft 22, but there is a possibility that the deflected base sheet 15 may be twisted. In addition, there is a possibility that the base sheet 15 is not wound on the winding shaft 22 properly, and in the worst case, the base sheet 15 may come off from the winding shaft 22. If the base sheet 15 comes off from the winding shaft 22, winding cannot be normally performed, and therefore, a sheet jam may occur, and the printing operation may not be continued.

As illustrated in FIG. 1, the label printer 10 of the present embodiment includes the driven roller 23 that presses the base sheet 15 wound on the winding shaft 22, thereby preventing the base sheet 15 from being deflected during the back feed operation.

As described above, the label printer 10 includes the platen roller 17 which conveys the long label sheet 13 with the plurality of labels 14 on the base sheet 15 in the forward direction and the backward direction, the thermal head 16 which prints on the label 14 in the process of conveying the label sheet 13, the peeling bar 18 which bends the label sheet 13 passing through the thermal head 16 and peels the label 14 after printing from the base sheet 15, the winding shaft 22 which winds up the base sheet 15 from which the label 14 was peeled, and the driven roller 23 that presses the base sheet 15 wound around the winding shaft 22 and follows the rotation of the winding shaft 22 and the movement of the base sheet 15 wound around the winding shaft 22. Therefore, it is possible to improve the running stability and the winding property of the base sheet 15 at the time of winding and back feeding the base sheet 15 after printing.

In the label printer 10, the driven roller 23 is supported by the support member 24 biased in a direction toward the winding shaft 22. Therefore, it is possible to prevent the occurrence of the deflection of the base sheet 15 when the back feed operation is performed.

Further, in the label printer 10, the wound base sheet 15 is sandwiched between the driven roller 23 and the winding shaft 22. Therefore, the running stability of the base sheet 15 can be enhanced.

Further, in the label printer 10, the driven roller 23 includes the protrusion 28 and the opening 31 that hold the state in which the pressure on the base sheet 15 is released. Therefore, the work of removing the base sheet 15 wound on the winding shaft 22 and the work of attaching the new base sheet 15 to the winding shaft 22 can be easily performed.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A label printer for printing on a label sheet that is stored in a rolled shape and includes a base sheet and a plurality of labels attached thereon, the label printer comprising:
- a platen roller configured to convey the label sheet;
- a head configured to print on a label of the conveyed label sheet;
- a peeling bar by which the printed label is peeled off from the base sheet;
- a winding shaft configured to rotate to wind thereon the base sheet from which the printed label has been peeled off;
- a support member configured to pivot around an axis at a first end thereof; and
- a driven roller attached to a second end of the support member that is opposite to the first end thereof, wherein
- the support member is biased to press the driven roller against the base sheet that is wound around the winding shaft.

2. The label printer according to claim 1, further comprising:
- a pair of attachment members fixed to a housing of the label printer and between which the support member is rotatably held via a rotation shaft;
- a plate-shaped member between the attachment members, facing the support member, and having an opening; and a protrusion protruding from the support member and engageable with the opening.

3. The label printer according to claim 2, further comprising:

a torsion spring on the rotation shaft and by which a bias force for the support member is generated.

4. The label printer according to claim 2, wherein the driven roller does not press the base sheet when the protrusion engages with the opening.

5. The label printer according to claim 4, wherein the driven roller presses the base sheet when the protrusion does not engage with the opening.

6. The label printer according to claim 2, further comprising:

a lever attached to one of the attachment members and by which the protrusion can be disengaged from the opening.

7. The label printer according to claim 1, wherein the platen roller and the winding shaft rotate simultaneously to convey the label sheet in a first direction along a conveyance path when the head is printing on the label.

8. The label printer according to claim 1, wherein the platen roller and the winding shaft rotate simultaneously to convey the label sheet in a second direction opposite to the first direction along a conveyance path after the head has printed on the label and before the head prints on a next label.

9. The label printer according to claim 1, further comprising:

a discharge port through which the peeled label is discharged, wherein the peeling bar protrudes toward the discharge port.

10. A label printer for printing on a label sheet stored in a rolled shape and including a base sheet and a plurality of labels attached thereon, the printer comprising:

a conveyance unit configured to convey the label sheet;

a printing unit configured to print on a label of the conveyed label sheet;

a label peel unit by which the printed label is peeled off from the base sheet;

a base sheet winding unit configured to rotate to wind thereon the base sheet from which the printed label has been peeled off;

a support member configured to pivot around an axis at a first end thereof; and a pressing unit attached to a second end of the support member that is opposite to the first end thereof, wherein the support member is biased to press the pressing unit against the base sheet that is wound around the base sheet winding unit.

11. The label printer according to claim 10, further comprising:

a pair of attachment members fixed to a housing of the label printer and between which the support member is rotatably held via a rotation shaft;

a plate-shaped member between the attachment members, facing the support member, and having an opening; and a protrusion protruding from the support member and engageable with the opening.

12. The label printer according to claim 11, further comprising:

a torsion spring on the rotation shaft and by which a bias force for the support member is generated.

13. The label printer according to claim 11, wherein the pressing unit does not press the base sheet when the protrusion engages with the opening.

14. The label printer according to claim 13, wherein the pressing unit presses the base sheet when the protrusion does not engage with the opening.

15. The label printer according to claim 11, further comprising:

a lever attached to one of the attachment members and by which the protrusion can be disengaged from the opening.

16. The label printer according to claim 10, wherein the conveyance unit and the base sheet winding unit rotate simultaneously to convey the label sheet in a first direction along a conveyance path when the printing unit is printing on the label.

17. The label printer according to claim 10, wherein the conveyance unit and the base sheet winding unit rotate simultaneously to convey the label sheet in a second direction opposite to the first direction along a conveyance path after the printing unit has printed on the label and before the printing unit prints on a next label.

18. The label printer according to claim 10, further comprising:

a discharge port through which the peeled label is discharged, wherein the label peel unit protrudes toward the discharge port.

* * * * *